(12) United States Patent
Ott

(10) Patent No.: US 12,077,106 B1
(45) Date of Patent: Sep. 3, 2024

(54) ORTHOGONAL GEOMETRIC ISOLATOR

(71) Applicant: ITT Manufacturing Enterprises LLC, Wilmington, DE (US)

(72) Inventor: Mark J Ott, Orchard Park, NY (US)

( * ) Notice: Subject to any disclaimer, the term of this patent is extended or adjusted under 35 U.S.C. 154(b) by 613 days.

(21) Appl. No.: 17/342,597

(22) Filed: Jun. 9, 2021

Related U.S. Application Data

(60) Provisional application No. 63/041,462, filed on Jun. 19, 2020.

(51) Int. Cl.
*B60R 13/08* (2006.01)
*G10K 11/162* (2006.01)

(52) U.S. Cl.
CPC ............ *B60R 13/08* (2013.01); *G10K 11/162* (2013.01); *B60R 2013/0807* (2013.01)

(58) Field of Classification Search
CPC .......... G10K 11/162; B60R 2013/0807; B60R 13/08
USPC .......................................................... 181/286
See application file for complete search history.

(56) References Cited

U.S. PATENT DOCUMENTS

| | | | | |
|---|---|---|---|---|
| 3,257,516 A * | 6/1966 | Hugh | ................... | H04R 25/604 |
| | | | | 381/345 |
| 4,074,491 A * | 2/1978 | Bell | ...................... | F16B 37/041 |
| | | | | 411/116 |
| 5,850,814 A * | 12/1998 | Fenn | .................. | B22D 19/0009 |
| | | | | 123/193.2 |
| 5,875,067 A * | 2/1999 | Morris | ................... | G11B 33/08 |
| | | | | 360/99.18 |
| 8,882,089 B2 | 11/2014 | Weisbeck | | |
| 11,117,350 B2 * | 9/2021 | Hällfors | ................ | B32B 21/047 |
| 11,276,382 B2 * | 3/2022 | Hernandez Covarrubias | .............. | |
| | | | | G10K 11/162 |
| 11,867,123 B2 * | 1/2024 | Zameroski | ................ | F02C 7/20 |
| 2004/0150144 A1 * | 8/2004 | Goepfert | ............... | F16F 1/3735 |
| | | | | 267/136 |
| 2005/0082111 A1 * | 4/2005 | Weber | ..................... | B60R 13/08 |
| | | | | 181/204 |
| 2007/0158888 A1 * | 7/2007 | Domen | ................. | F16F 1/3732 |
| | | | | 267/136 |
| 2015/0211592 A1 * | 7/2015 | Rawson | ................ | F16F 3/0873 |
| | | | | 267/141.1 |
| 2015/0252871 A1 * | 9/2015 | Kondo | .................... | F16F 1/373 |
| | | | | 267/141 |
| 2018/0180135 A1 * | 6/2018 | Nydam | .................. | B62D 24/02 |
| 2021/0295813 A1 * | 9/2021 | Gernhart | ................ | G10K 11/16 |
| 2022/0042569 A1 * | 2/2022 | Ott | ........................ | F16F 13/105 |
| 2023/0184373 A1 * | 6/2023 | Hurtado | .................. | B64C 1/403 |
| | | | | 248/228.6 |

FOREIGN PATENT DOCUMENTS

CN           106882129 B   *   5/2019   ............. B60R 13/08

* cited by examiner

*Primary Examiner* — Forrest M Phillips
(74) *Attorney, Agent, or Firm* — Turk IP Law, LLC

(57) ABSTRACT

Technologies are generally described for an acoustic isolator that may be designed to have equal stiffness along all axes. Example acoustic isolator devices may include a symmetrical design, that may be formed by a molding process or plastic or metal, or alternatively by an injection process.

19 Claims, 8 Drawing Sheets

ORTHOGONAL GEOMETRIC ISOLATOR

CROSS REFERENCE TO RELATED APPLICATIONS

This application claims the benefit of U.S. Provisional Patent Application Ser. No. 63/041,462 filed on Jun. 19, 2020. The disclosures of the above application are hereby incorporated by reference for all purposes.

BACKGROUND

Unless otherwise indicated herein, the materials described in this section are not prior art to the claims in this application and are not admitted as prior art by inclusion in this section.

The careful selection of materials used in vehicles such as aircraft are often decided based on their structural performance. However, it is equally important to consider the implications of vibration and noise performance of those materials when used in passenger compartments. Vibration and noise effects can often be caused by the coupling and mounting components of panels in the passenger compartment. For example, a trim panel on the interior portion of an aircraft may vibrate and create unpleasant noise that results in a poor passenger experience.

Noise isolators can be developed that use resilient materials such as elastomers to mount interior panels and thus dampen vibration and noise that results from those interior panels. In order to be effective, trim panel isolators should have low damping, as well as a soft spring like action that absorbs and impedes the migration of noise to adjacent panels in the passenger compartment.

The present disclosure contemplates an economical solution for an isolator that is easy to manufacture, while also providing acceptable attenuation of structure borne noise within the passenger compartment.

SUMMARY

The present disclosure generally describes technologies for an acoustic isolator device that may be designed to have equal stiffness along all axes. Example acoustic isolator devices may include a symmetrical design, that may be formed by a molding process or plastic or metal, or alternatively by an injection process.

According to some examples, an acoustic isolator device may include a first side face aligned along a first axis as a first portion of an exterior wall; a second side face aligned along the first axis as a second portion of the exterior wall; a first edge face between the first side face and a first vertex; a second edge face between the first side face and a second vertex; a third edge face between the first vertex and the second side face; and a fourth edge face between the second vertex and the second side face, wherein the first side face and the second side face are opposite one another with respect to a second axis that is orthogonal to the first axis; a length of the first edge face is substantially matched to the length of the second edge; the first and second vertices are equidistant from the second axis and aligned along the first axis; and a length of the third edge face is substantially matched to a length of the fourth edge face.

According to other examples, the acoustic isolator device may further include a first curved face portion and a second curved face portion, where the first and third edge faces are joined at the first vertex by the first curved face portion, and where the second and fourth faces are joined at the second vertex by a second curved face portion. The first and second curved face portions may have a shaped that corresponds to one of: an arc, a semi-circle, or a semi-ellipse. The acoustic isolator device may further include a first coupling surface and a second coupling surface, where the first coupling surface is coupled to the first side face, the second coupling surface is coupled to the second side face, and where the first coupling surface is separated from the second coupling surface by an interior cavity region.

According to further examples, one or more of the first coupling surface and the second coupling surface may be located in a plane of the first axis and the second axis. The first coupling surface may include an aperture that accepts a fastener to couple the acoustic isolator device to a panel of a vehicle. The first coupling may be is a floating insert face that is large enough to attach to a vehicle panel without requiring a strict alignment thereof. The second coupling surface may include a second aperture that accepts a fastener to couple the acoustic isolator device to a chassis of a vehicle.

According to some examples, the acoustic isolator device may further include a first coupling surface with a first aperture; a second coupling surface with a second aperture, where the first coupling surface is adjacent to the first side face, the second coupling surface is adjacent to the second side face, and the first coupling surface is separated from the second coupling surface by an interior cavity region; the first aperture accepts a first fastener to fasten the acoustic isolator device to a panel of a vehicle; and the second aperture accept a second fastener to fasten the acoustic isolator device to a chassis of the vehicle. The device may also include a third coupling surface with a third aperture, where the third coupling surface is adjacent to the first side face and aligned with the first coupling surface such that the first aperture and the third aperture are aligned to form a via. The device may further include a fourth coupling surface with a fourth aperture, where the fourth coupling surface is adjacent to the second side face and aligned with the second coupling surface such that the second aperture and the fourth aperture are aligned to form a second via. The device may also include a post that projects away from the fourth coupling surface, where the post aids in alignment to the chassis of the vehicle.

According to other examples, an acoustic isolator device may include a first side face aligned along a first axis as a first portion of an exterior wall; a second side face aligned along the first axis as a second portion of the exterior wall; a first edge face between the first side face and a first vertex; a second edge face between the first side face and a second vertex; a third edge face between the first vertex and the second side face; a fourth edge face between the second vertex and the second side face; a first curved face portion between the first edge face and the third edge face about the first vertex; and a second curved face portion between the second edge face and the fourth edge face about the second vertex, where the first side face and the second side face are opposite one another with respect to a second axis that is orthogonal to the first axis; a length of the first edge face is substantially matched to the length of the second edge; the first and second vertices are equidistant from the second axis and aligned along the first axis; and a length of the third edge face is substantially matched to a length of the fourth edge face.

According to further examples, the first and second curved face portions may have a shape that corresponds to one of: an arc, a semi-circle, or a semi-ellipse. The acoustic isolator device may further include a first coupling surface with a first aperture; a second coupling surface with a second aperture, where the first coupling surface is adjacent to the first side face, the second coupling surface is adjacent to the second side face, and the first coupling surface is separated from the second coupling surface by an interior cavity region; the first aperture accepts a first fastener to fasten the acoustic isolator device to a panel of a vehicle; and the second aperture accept a second fastener to fasten the acoustic isolator device to a chassis of the vehicle. The acoustic isolator device may also include a post that projects away from the first coupling surface, where the post aids in alignment to the chassis of the vehicle.

According to yet other examples, a method of manufacturing an acoustic isolator device may include selecting load requirements for the acoustic isolator device; selecting a material to form the acoustic isolator device; determining one or more design parameters for the acoustic isolator device based on the selected load requirements and the selected material; forming the acoustic isolator device from the material using the determined design parameters such that the formed acoustic isolator device has a geometric shape including: a first side face aligned along a first axis as a first portion of an exterior wall; a second side face aligned along the first axis as a second portion of the exterior wall, wherein the first side face and the second side face are opposite one another with respect to a second axis that is orthogonal to the first axis; a first edge face between the first side face and a first vertex; a second edge face between the first side face and a second vertex, wherein a length of the first edge face is substantially matched to the length of the second edge; a third edge face between the first vertex and the second side face; a fourth edge face between the second vertex and the second side face, where a length of the third edge face is substantially matched to a length of the fourth edge face; a first curved face portion between the first edge face and the third edge face about the first vertex; a second curved face portion between the second edge face and the fourth edge face about the second vertex; a first coupling surface adjacent a top portion of the first side face with a first aperture; a second coupling surface adjacent a top portion of the second side face with a second aperture; a third coupling surface adjacent a bottom portion of the first side face with a third aperture that is aligned with the first aperture; and a fourth coupling surface adjacent the bottom portion of the second side face with a fourth aperture that is aligned with the second aperture.

According to some examples, forming the acoustic isolator device may include molding or machining a material of plastic, Teflon, metal, carbon fiber or elastomer. Forming the acoustic isolator device further include coating the acoustic isolator a resilient material. The determined design parameters may correspond to one or more of a leg width, leg length, leg depth and leg thickness for the acoustic isolator device, where the leg width corresponds to a first distance between the first vertex and the second vertex; the leg length corresponds to a second distance between the first and third edge faces through the first curved portion; and the leg depth corresponds to a third distance between the top portion of the second side face and the bottom portion of the second side face.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5 illustrates a fifth perspective view of an example acoustic isolator device;

Figure 1:
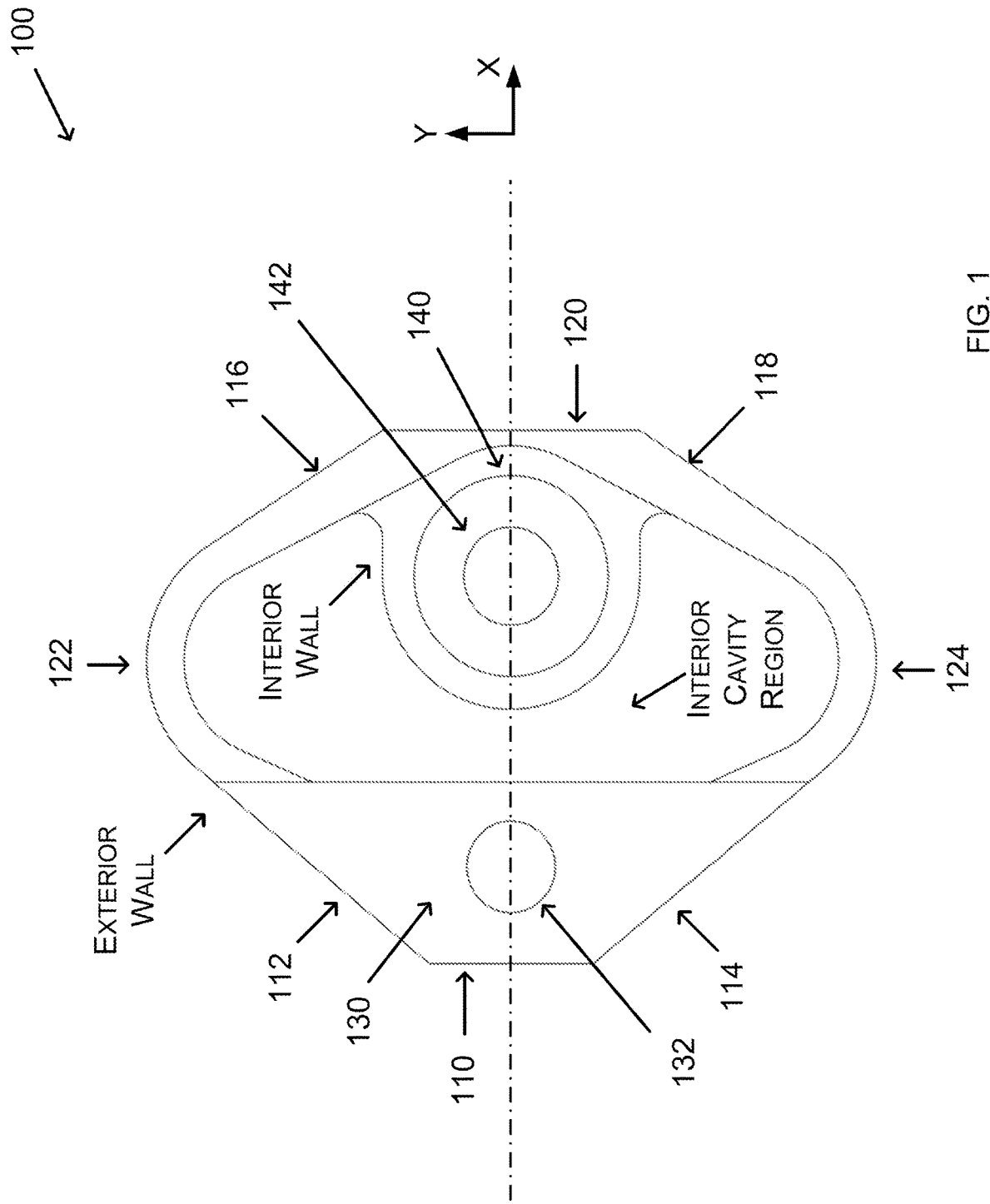
FIG. 1 illustrates a first perspective view of an example acoustic isolator device.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems and/or devices that are configured for use as an acoustic isolator.

Briefly stated, technologies are generally described for an acoustic isolator device that may be designed to have equal stiffness along all axes. Example acoustic isolator devices may include a symmetrical design, that may be formed by a molding process or plastic or metal, or alternatively by an injection process.

FIG. 1 illustrates a first perspective view of an example acoustic isolator device 100 arranged in accordance with at least some embodiments described herein. The example acoustic isolator device 100 is illustrated as a top-down perspective view, such as in an X-Y plane.

As illustrated, acoustic isolator device 100 includes a first side face 110, a second side face 120, a first pair of edge faces 112 and 114, a second pair of edge faces 116 and 118, with a first coupling surface 130 and a second coupling surface 140. A first aperture 132 may be located in the first coupling surface 130, where the first aperture 132 may define a through hole in the acoustic device 100. A second aperture 142 may be located in the second coupling surface 140, where the second aperture 142 may define another through hole in the acoustic device 100.

The illustrated faces 110, 112, 114, 116, 118, and 120 all correspond to different regions of an exterior wall of the acoustic device 100. First side face 110 is located between the first pair of edge faces 112 and 114, while the second side face 118 is located between the second pair of edge faces 116 and 118. Edge faces 112 and 116 meet at a first vertex region 122 of the exterior wall; while edge faces 114 and 118 meet at a second vertex region 124. The first side face 110 is located along the exterior wall of the acoustic device at a substantially opposite location with respect to the second side face 120 relative, and centered about, a first axis (e.g., an x-axis). The first vertex region 122 is located along the exterior wall of the acoustic device at a substantially opposite location with respect to the second vertex region 124 relative to a second axis (e.g., a y-axis). The length of the faces 112 and 114 are substantially matched, as are the length of the faces 116 and 118; such that the acoustic device 100 is substantially symmetrical with respect to the first axis (e.g., x-axis). The first axis (e.g., x-axis) and the second axis (e.g., y-axis) form an orthogonal set of axes.

In some examples, the exterior wall of the acoustic isolator device 100 includes a substantially curved face about the vertices 122 and 124. For example, edge faces 112 and 116 may be joined at vertex 122 by a first curved face portion; while edge faces 114 and 118 may be joined at vertex 125 by a second curved face portion. The first and second curved face portions will have substantially the same shape and arc length to maintain a symmetrical design. The curved face portions may be arcs, semi-circular, semi-elliptical, or some other curved shape as may be required in a specific design.

The first coupling surface 130 may be coupled to the first side face 110 and located in a plane of the first and second axis (e.g., an X-Y plane). The second coupling surface 140 may be coupled to the second side face 129 and located in a plane of the first and second axis (e.g., an X-Y plane). An interior cavity region of the acoustic isolator separates the first coupling surface 130 and the second coupling surface 140.

The first aperture 132 in the first coupling surface 130 may be configured to couple the acoustic isolator device 100 to a panel of a vehicle. In some examples, the panel corresponds to a panel of an aircraft. In various examples, the first aperture 132 corresponds to a through hole that can be coupled to the panel by a fastener. Example fasteners may include a rivet, a screw or any other reasonable coupling element. In some additional examples the first coupling surface is a floating insert face that is large enough to attach to a panel without requiring a strict alignment thereof. The floating insert can be molded or swaged into the material if desired. The floating insert accommodates assembly tolerance issues, preventing excessive assembly loads on the isolator which may cause an acoustic 'short' in the system.

The second aperture 142 in the second coupling surface 140 may be configured to couple the acoustic isolator device 100 to a chassis of a vehicle. In some examples, the chassis corresponds to a fuselage or frame of an aircraft. In various examples, the second aperture 142 corresponds to a through hole that can be coupled to the chassis by a fastener. Example fasteners may include a rivet, a screw or any other reasonable coupling element. In some additional examples the second coupling surface includes a recessed cavity such that the acoustic isolator 100 has a low profile where the fastener is received in the recessed cavity.

The acoustic isolator device 100 may be machined or molded from a plastic material such as Teflon or any other appropriate plastic material that has enough load bearing strength. In some examples the acoustic isolator device 100 may be comprised of metallic, carbon fiber, elastomeric, or other suitable composite materials.

The geometry of the acoustic isolator device 100 will be described further below. The geometry dictates the stiffness for the three orthogonal directions of the device (e.g., X, Y and Z directions). The geometry can be adapted by careful sizing to achieve similar stiffness in each axis of direction. The similar stiffness in all three directions performs better than a mount with one or two stiffer directional modes as it acts like an acoustic 'short' through the stiffer axes of the isolator.

Figure 2:
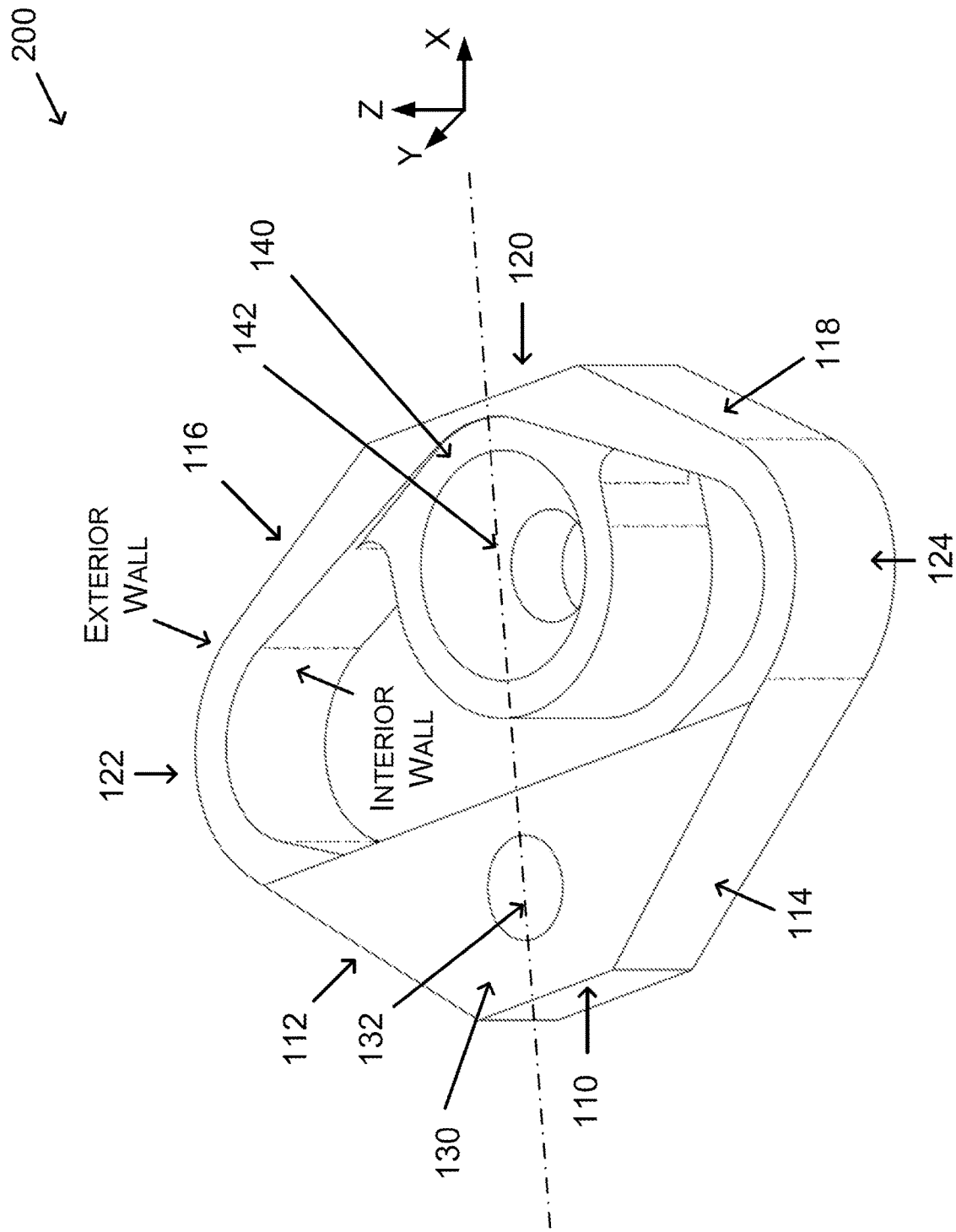
FIG. 2 illustrates a second perspective view of an example acoustic isolator device.

FIG. 2 illustrates a second perspective view of an example acoustic isolator device 200 arranged in accordance with at least some embodiments described herein. As illustrated, acoustic isolator device 200 includes a first side face 110, a second side face 120, a first pair of edge faces 112 and 114, a second pair of edge faces 116 and 118, with a first coupling surface 130 and a second coupling surface 140. A first aperture 132 may be located in the first coupling surface 130, where the first aperture 132 may define a through hole in the acoustic device 100. A second aperture 142 may be located in the second coupling surface 140, where the second aperture 142 may define another through hole in the acoustic device 100.

The example acoustic isolator device 200 is illustrated as a top-down perspective view, such as in an X-Y plane, but this time tilted off axis with respect to a z-axis. As illustrated, acoustic isolator device 200 includes a first side face 110, a second side face 120, a first pair of edge faces 112 and 114, a second pair of edge faces 116 and 118, with a first coupling surface 130 and a second coupling surface 140. A first aperture 132 may be located in the first coupling surface 130, where the first aperture 132 may define a through hole in the acoustic device 200. A second aperture 142 may be located in the second coupling surface 140, where the Second aperture 142 may define another through hole in the acoustic device 200.

The illustrated faces 110, 112, 114, 116, 118, and 120 correspond to different regions of an exterior wall of the acoustic device 200; where the first side face 110 is located between the first pair of edge faces 112 and 114, and the second side face 118 is located between the second pair of edge faces 116 and 118. Edge faces 112 and 116 meet at a first vertex region 122 of the exterior wall; while edge faces 114 and 118 meet at a second vertex region 124. The geometric shape of acoustic isolator device 200 in FIG. 2 is substantially similar to the geometric shape of acoustic isolator device 100 from FIG. 1.

The tilted perspective view of FIG. 2 helps to illustrate the shape of the vertex regions 122 and 124; as well as the thickness variations of the walls of the acoustic isolator device 200. As shown the thickness of the walls are defined as the region between the interior and exterior walls. At the vertex regions 122 and 124, the overall wall thicknesses are at their thinnest. However, the overall wall thickness gradually gets thicker between the vertex region and either of the side faces 110 and 120. This gradual increase in thickness of the wall of the acoustic device is substantially symmetrical about the x-axis, and also about the y-axis for at least a portion of the wall.

Also illustrated in FIG. 2, the aperture 142 in surface 140 is illustrated as having a substantially tapered shape. The tapered shape may be selected to accommodate a specific shaped coupler device. In some examples, the tapered shape matches the shape of a screw head such as a countersunk screw. This tapered shape may facilitate the acoustic isolator device 200 having a reduced overall thickness along the z-axis, which may be useful in applications where a low-profile acoustic isolator is desired.

Figure 3:
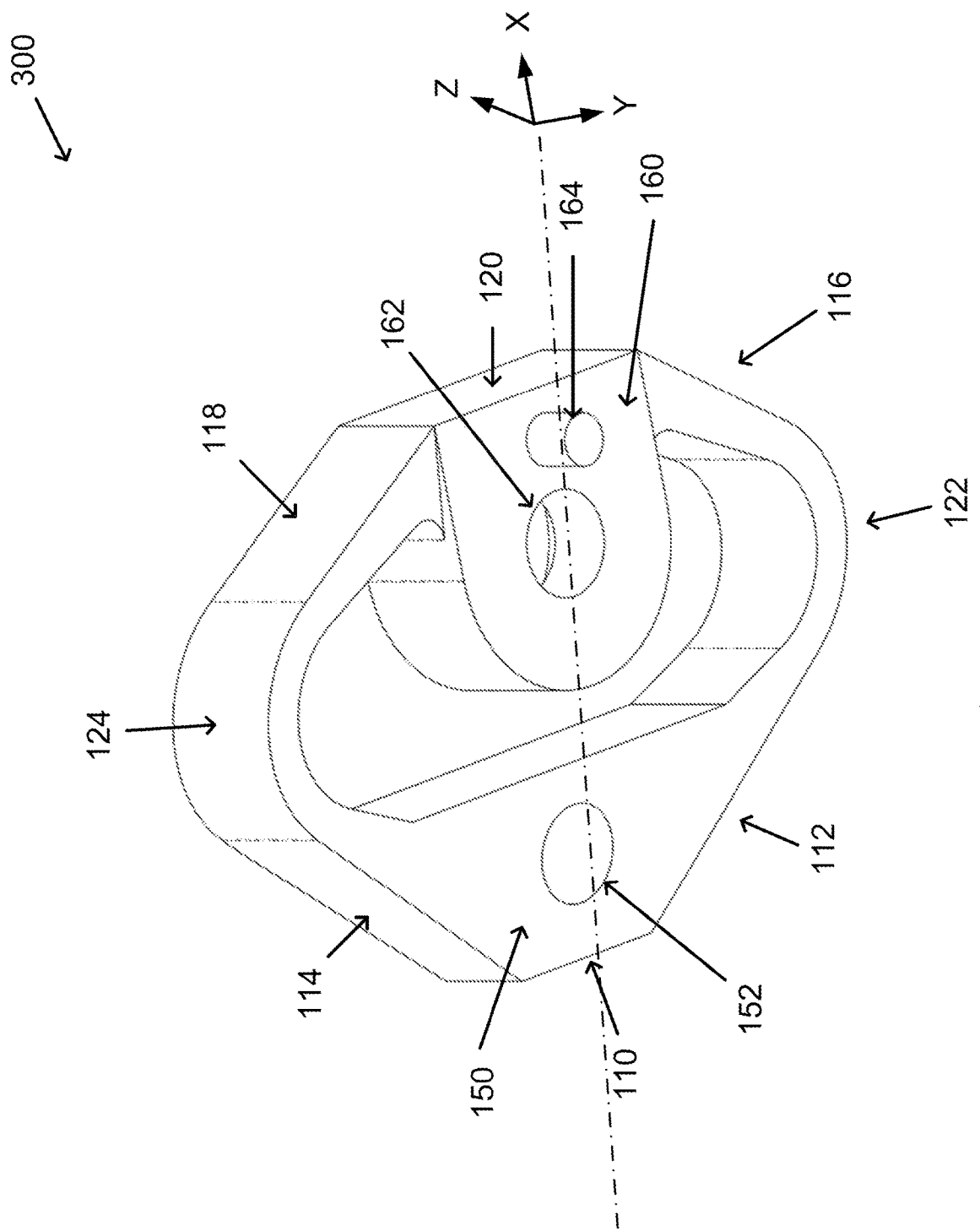
FIG. 3 illustrates a third perspective view of an example acoustic isolator device.

FIG. 3 illustrates a third perspective view of an example acoustic isolator device 300 arranged in accordance with at least some embodiments described herein. The example acoustic isolator device 300 is illustrated as a bottom-up perspective view, such as in an X-Y plane, tiled off axis with respect to a z-axis.

As illustrated, acoustic isolator device 300 includes a first side face 110, a second side face 120, a first pair of edge faces 112 and 114, a second pair of edge faces 116 and 118, with a third coupling surface 150 and a fourth coupling surface 160. A third aperture 152 may be located in the third coupling surface 150, where the third aperture 152 may define a through hole in the acoustic device 300. A fourth aperture 162 may be located in the fourth coupling surface 160, where the fourth aperture 162 may define another through hole in the acoustic device 300.

The illustrated faces 110, 112, 114, 116, 118, and 120 correspond to different regions of an exterior wall of the acoustic device 300; where the first side face 110 is located between the first pair of edge faces 112 and 114, and the second side face 118 is located between the second pair of edge faces 116 and 118. Edge faces 112 and 116 meet at a first vertex region 122 of the exterior wall; while edge faces 114 and 118 meet at a second vertex region 124. The geometric shape of acoustic isolator device 300 in FIG. 3 is substantially similar to the geometric shape of acoustic isolator device 200 from FIG. 2.

The tilted perspective view of FIG. 3 helps to illustrate the location of additional surfaces of the acoustic isolator device 300. The location of the surface 130 and the aperture 132 of FIG. 2 are substantially opposite and aligned with the surface 150 and aperture 152 of FIG. 3. Similarly, the location of the surface 140 and the aperture 142 of FIG. 2 are substantially opposite and aligned with the surface 160 and aperture 162 of FIG. 3.

Also shown in FIG. 3 is a post 164 which projects away from surface 160 of acoustic isolator device 300. Post 164 may be utilized to align and engage the acoustic coupler 300 with a panel (not shown). By engaging the panel with the post 164, the alignment is ensured to prevent the acoustic isolator device 300 from spinning out of proper orientation. Post 164 may be referred to as an anti-torque post, since it assists in both alignment and load carry.

Figure 4:
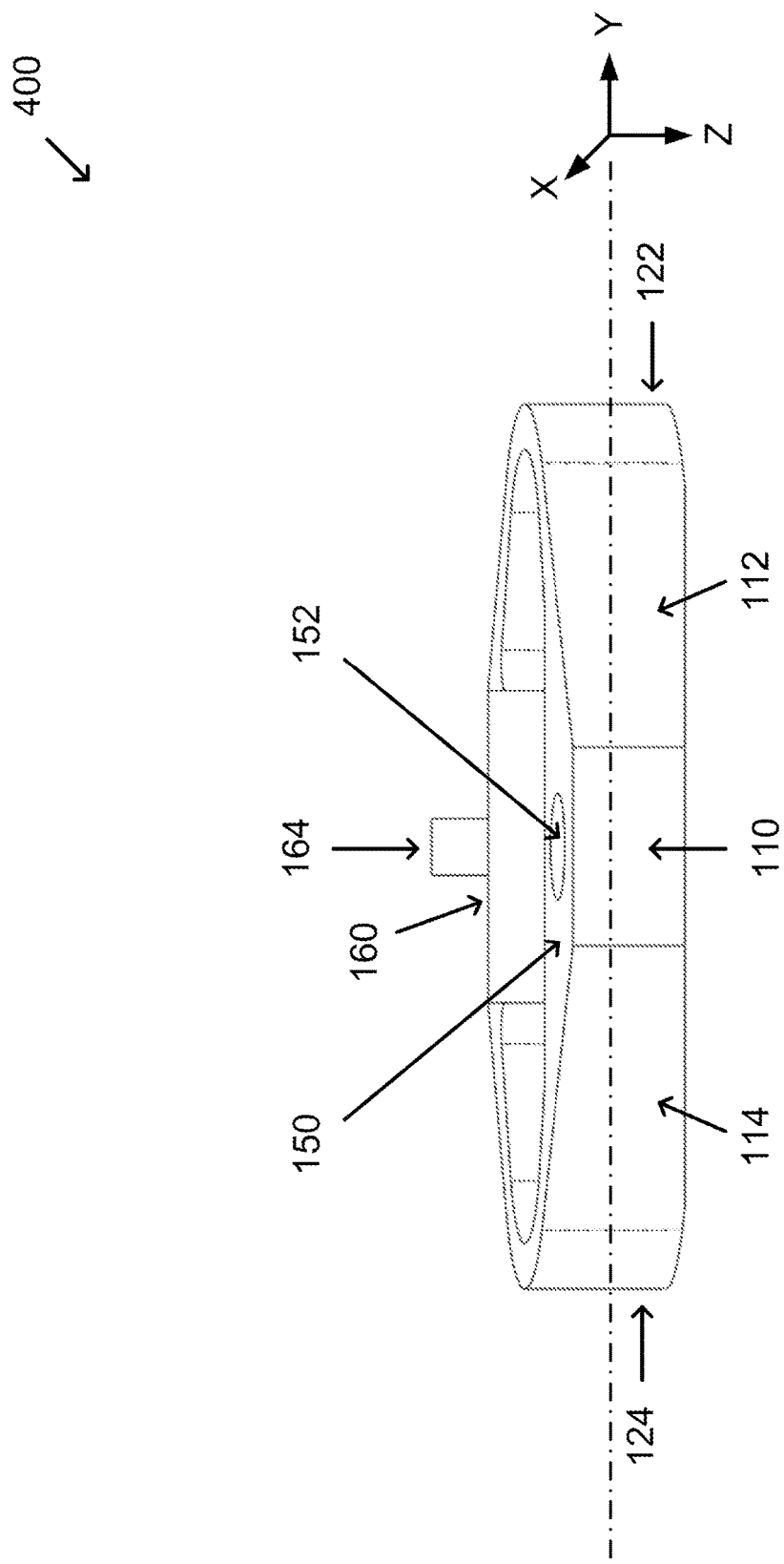
FIG. 4 illustrates a fourth perspective view of an example acoustic isolator device.

FIG. 4 illustrates a fourth perspective view of an example acoustic isolator device 400 arranged in accordance with at least some embodiments described herein. The example acoustic isolator device 400 is illustrated as a side perspective view, such as in a Y-Z plane As illustrated, acoustic isolator device 400 includes a first side face 110, a first pair of edge faces 112 and 114, with a third coupling surface 150 and a fourth coupling surface 160. A third aperture 152 may be located in the third coupling surface 150, where the third aperture 152 may define a through hole in the acoustic device 400. A post 164 extends away from the fourth surface 160. The geometric shape of acoustic isolator device 400 in FIG. 4 is substantially similar to the geometric shape of acoustic isolator device 300 from FIG. 3.

The side perspective view of FIG. 4 helps to illustrate the location of surfaces of the acoustic isolator device 400, as well as to illustrate a difference in height of various features in the Y-Z plane. For example, although surface 160 and surface 159 are both located in the X-Y plane, surface 160 is at an elevated location with respect to surface 150 in this view. Also, the post 164 is at a higher location where it projects away from surface 160, relative to the X-Y plane in this view.

Figure 5:
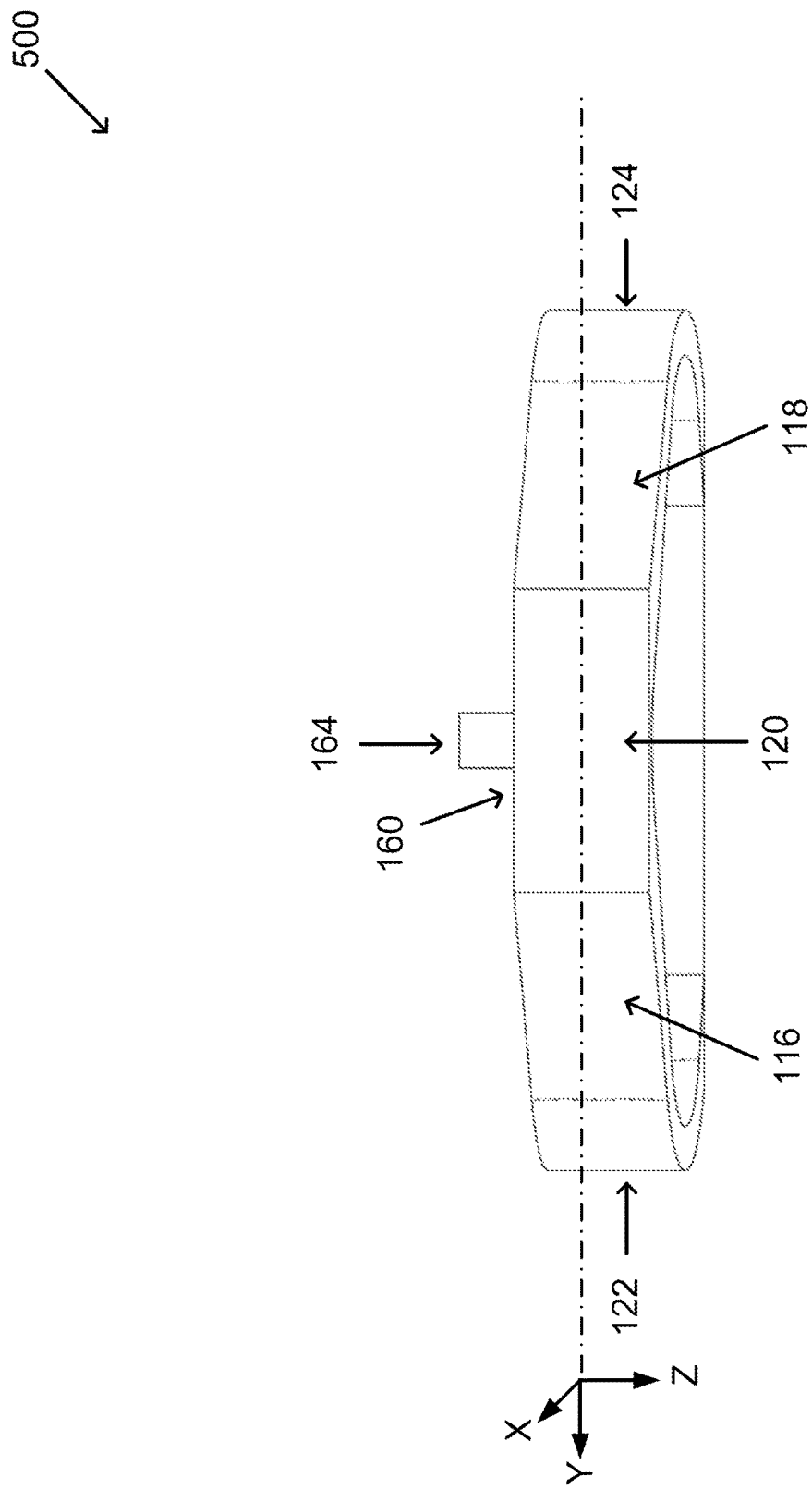
FIG. 5 illustrates a fourth perspective view of an example acoustic isolator device.

FIG. 5 illustrates a fifth perspective view of an example acoustic isolator device 500 arranged in accordance with at least some embodiments described herein. The example acoustic isolator device 400 is illustrated as a side perspective view, such as in a Y-Z plane As illustrated, acoustic isolator device 500 includes a second side face 120, a pair of edge faces 116 and 118, with a fourth coupling surface 160. A post 164 extends away from the fourth surface 160. The geometric shape of acoustic isolator device 500 in FIG. 5 is substantially similar to the geometric shape of acoustic isolator device 400 from FIG. 4.

The side perspective view of FIG. 5 further illustrates the location of surfaces of the acoustic isolator device 500, as well as to illustrate a difference in height of various features in the Y-Z plane. For example, surface 160 and post 164 are at a higher location relative to the X-Y plane in this view.

Figure 6:
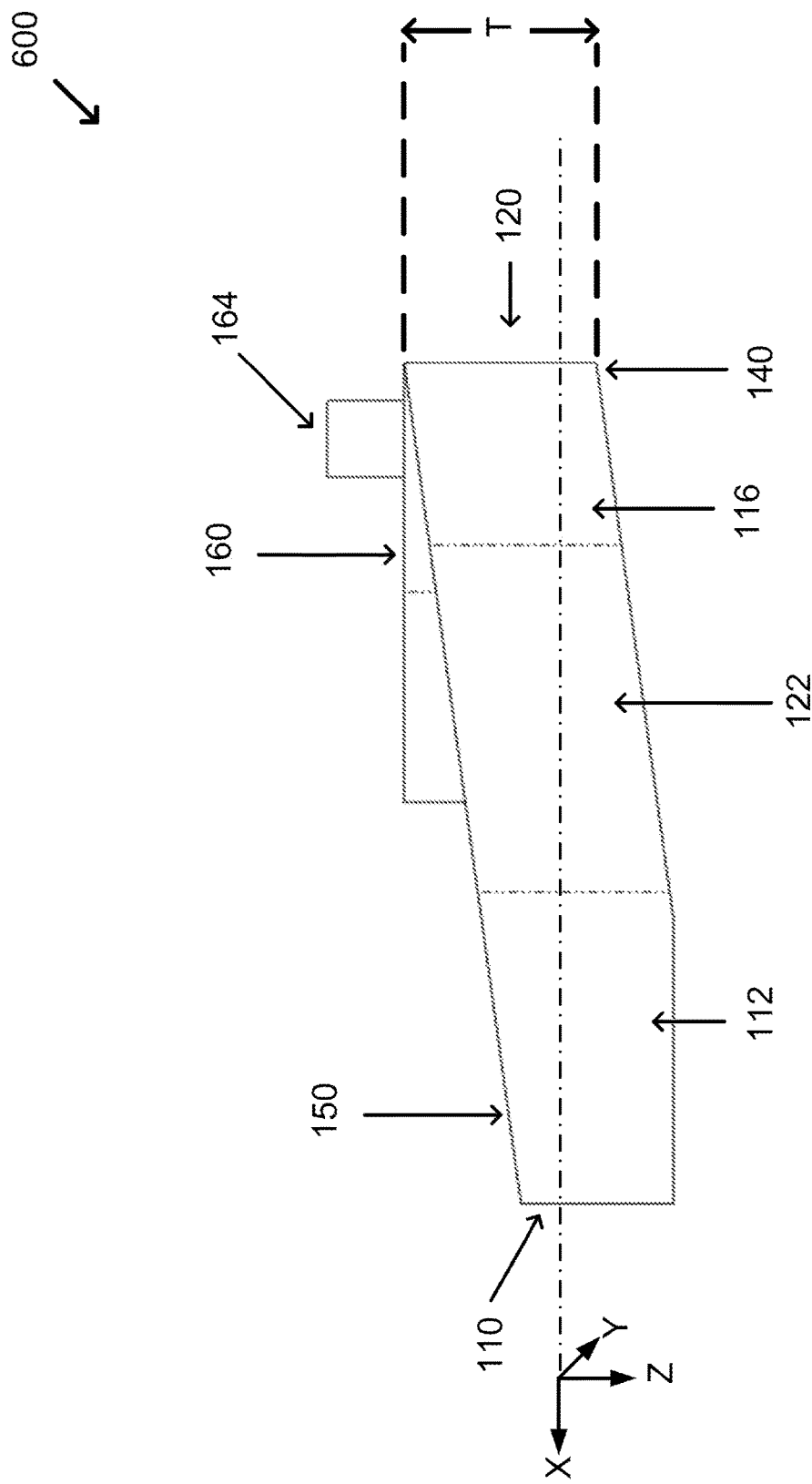
FIG. 6 illustrates a sixth perspective view of an example acoustic isolator device.

FIG. 6 illustrates a sixth perspective view of an example acoustic isolator device 600 arranged in accordance with at least some embodiments described herein. The example acoustic isolator device 600 is illustrated as a side perspective view, such as in a X-Z plane As illustrated, acoustic isolator device 600 includes a first side face 110, a second side face 120, edge faces 112 and 116, vertex 122, and a coupling surface 160 with a post 164 extending away from the coupling surface 160. The geometric shape of acoustic isolator device 600 in FIG. 6 is substantially similar to the geometric shape of acoustic isolator device 500 from FIG. 5.

The side perspective view of FIG. 6 helps to illustrate the profile of the side elevation with a difference in height of various features in the Y-Z plane. For example, although faces 110 and 120 are both located in the Y-Z plane, surface 110 is at a lower overall elevation with respect to the surface 120 in this view. Additionally, surface 160 has a flat surface relative to the X-Y plane, while surface 159 is at a lower elevation, and is angled with respect to the X-Y plane in this view. Also, the post 164 is at a higher location where it projects away from surface 160, relative to the X-Y plane in this view.

FIG. 6 also shows a thickness parameter T of the acoustic isolator device 600. The thickness is determined by the height of the exterior wall at face 120; which corresponds to the difference from surface 140 to the surface 160. Thickness T may be selected to adjust the overall stiffness of the acoustic coupler 600 in the Z direction.

Figure 7:
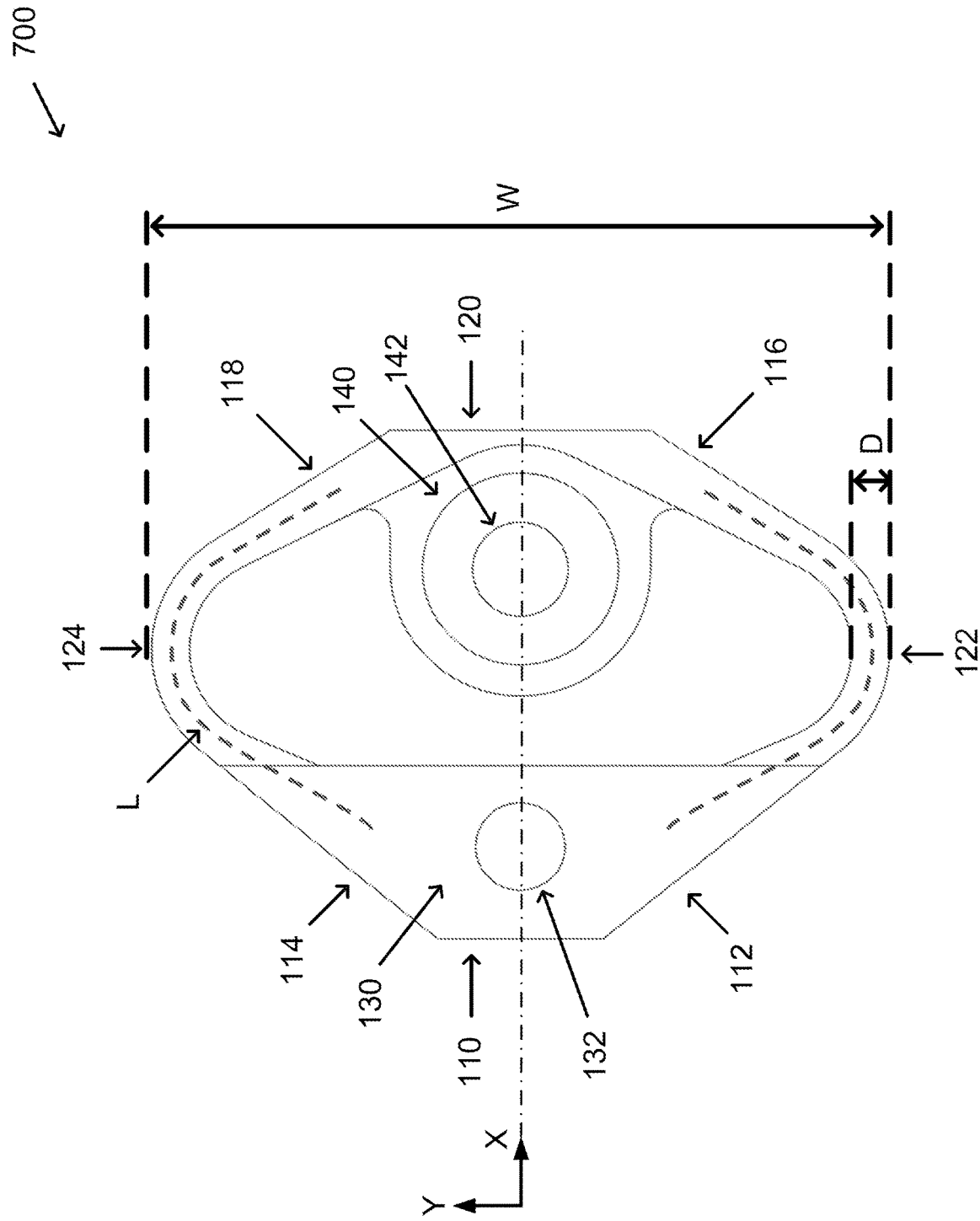
FIG. 7 illustrates a sixth perspective view of an example acoustic isolator device.

FIG. 7 illustrates a seventh perspective view of an example acoustic isolator device 700 arranged in accordance with at least some embodiments described herein. The example acoustic isolator device 700 is illustrated as a top-down perspective view, such as in a X-Y plane.

Acoustic isolator device 700 includes a first side face 110, a second side face 120, a first pair of edge faces 112 and 114, a second pair of edge faces 116 and 118, with a first coupling surface 130 and a second coupling surface 140. A first aperture 132 may be located in the first coupling surface 130, where the first aperture 132 may define a through hole in the acoustic device 100. A second aperture 142 may be located in the second coupling surface 140, where the second aperture 142 may define another through hole in the acoustic device 100.

The geometric shape of acoustic isolator device 700 in FIG. 7 is substantially similar to the geometric shape of acoustic isolator device 100 from FIG. 1. Additional design parameters are illustrated in FIG. 7, which can be adjusted to facilitate a particular acoustic coupler design. The illustrated design parameters of FIG. 7 include a leg length L; a width W, and a depth D.

The width W of the acoustic isolator device 700 corresponds to the measured distance between the vertexes 122 and 124 along the Y-axis. The depth D of the acoustic isolator corresponds to the thickness of the wall as measured from the interior wall to the exterior wall at the vertex 122. The leg length L is measured as the total distance from side face 114 to side face 118, passing through vertex 124.

It is important to note that the dimensional design of depth D, width W and leg length L should be symmetrical about the X-axis, in this example. For a symmetrical design the wall thickness at vertex 122 should match the wall thickness at vertex 124; the width W should bisect the X-axis with matched distances from the X-axis the vertices; and the leg length about vertex 122 should match the leg length about vertex 124.

Figure 8:
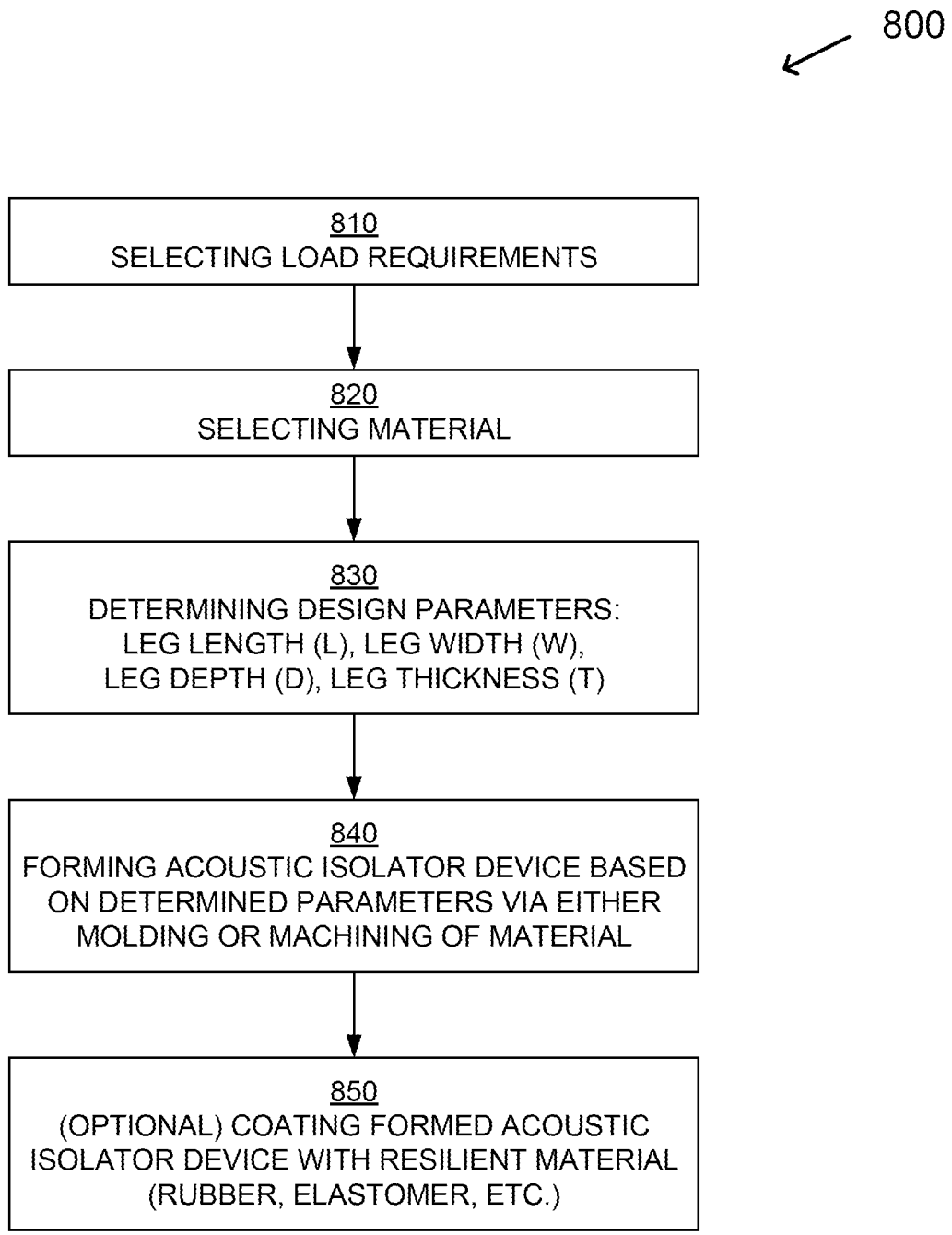
FIG. 8 illustrates a process flow for an example method of forming an acoustic isolator device.

FIG. 8 illustrates a process flow for an example method 800 of forming an acoustic isolator device, arranged in accordance with at least some embodiments of the present disclosure.

The described method 800, may include block 810, "SELECTING LOAD REQUIREMENTS", block 820, "SELECTING MATERIAL", block 830, "DETERMINING DESIGN PARAMETERS: LEG LENGTH (L), LEG WIDTH (W), LEG DEPTH (D), LEG THICKNESS (T)", block 840, "FORMING ACOUSTIC ISOLATOR DEVICE BASED ON DETERMINED PARAMETERS VIA EITHER MOLDING OR MACHINING OF MATERIAL", and block 850, "COATING FORMED ACOUSTIC ISOLATOR DEVICE WITH RESILIENT MATERIAL (RUBBER, ELASTOMER, ETC.)".

An example process may begin at block 810, where the load requirements of the acoustic isolator device may be input into the system. Block 810 may be followed by block 820, where the specific material to be used for manufacturing the acoustic isolator device is selected. Block 820 may be followed by block 830, where design parameters for the acoustic isolator device (e.g., L, W, D, T) are determined based on the selected load requirements and the selected material. Block 830 may be followed by block 840, where the acoustic isolator device is formed based on the determined parameters. Block 840 may optionally be followed by block 850, where the acoustic isolator device may be coated with a resilient material to improve the dampening characteristics of the device.

At block 810, load requirements are input into the system based on the particular end use application of the acoustic isolator. Example load requirements may include weight, torque, sheer strength, stress, or other expected load requirements based on the specific type of application of the desired acoustic isolator device.

At block 820, a material may be selected for manufacturing the acoustic isolator device. The material selected may be a plastic material such as a Teflon® material, a metal material, a composite material such as Kevlar®, or some other material. Selecting of the material may be input into a system which may perform a look up of known materials previously used.

At block 830, one more design parameters may be determined based on the given load requirements at block 810 and the material selected at block 820. So, for example, a system may be configured for calculating the design parameters previously described for leg length (L), leg width (W), leg depth (D), leg thickness (T) based on the selected load requirements and the selected material.

At block 840, an acoustic isolator may be formed based on the input design parameters including the selected material. The forming of acoustic isolator may be done by either molding or machining of the material based on the determined design parameters.

At block 850, the formed acoustic isolator may optionally be coated with a resilient material such as a rubber material or an elastomer material, etc. Coating may be done by dipping or spraying the acoustic isolator device in the resilient material.

The above-described acoustic isolator has a reduced cost when compared to other competing devices. The reduction in cost can be achieved since the described acoustic isolator devices can be achieved by manufacturing a unitary molded design. The materials that may be employed for molding an acoustic isolator may include a plastic material, metal material, or some other composite material such as Kevlar. Alternatively, the design can be formed by an injection process such as a metal injection. The resulting acoustic isolator products have adequate sound isolation performance and low cost. If enhanced vibration performance is desired, the unitary body design can be coated with a rubber type of material to improve damping.

In some designs the stiffness of the acoustic isolator is designed to be substantially the same across all axes so that no weak path will promote transmission of vibration. For example, the stiffness along the X-axis should be the same as the stiffness along the Y-axis, and also the same as the stiffness along the Z-axis. The stiffness of the acoustic isolator will be determined by the material used, as well as the dimensional constraints on the described parameters for thickness T, width W, depth D and leg length L.

In some designs the stiffness of the acoustic isolator is designed to be substantially different along one or more-dimensional paths (e.g., X, Y or Z) to increase the rigidity or load capacity as may be required in a particular implementation.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only and is not intended to be limiting.

The herein described subject matter sometimes illustrates different components contained within, or connected with, different other components. Such depicted architectures are merely examples, and in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. An acoustic isolator device, comprising:
   a flat first side face aligned along a first axis as a first portion of an exterior wall;
   a flat second side face aligned along the first axis as a second portion of the exterior wall;
   a first edge face between the first side face and a first vertex;
   a second edge face between the first side face and a second vertex;
   a third edge face between the first vertex and the second side face;
   a fourth edge face between the second vertex and the second side face; and
   a first coupling surface coupled to the first side face and a second coupling surface coupled to the second side face;
   wherein:
   the first side face and the second side face are opposite one another with respect to a second axis that is orthogonal to the first axis;
   a length of the first edge face is substantially matched to the length of the second edge;
   the first and second vertices are equidistant from the second axis and aligned along the first axis;
   a length of the third edge face is substantially matched to a length of the fourth edge face;
   the first coupling surface is separated from the second coupling surface by an interior cavity region defined by a substantially irregular shaped interior wall; and
   a central portion of the interior wall facing the second side face is substantially semi-circle shaped.

2. The acoustic isolator device of claim 1, further comprising a first curved face portion and a second curved face portion, wherein the first and third edge faces are joined at the first vertex by the first curved face portion, and wherein the second and fourth faces are joined at the second vertex by a second curved face portion.

3. The acoustic isolator device of claim 2, wherein the first and second curved face portions have a shaped that corresponds to one of: an arc, a semi-circle, or a semi-ellipse.

4. The acoustic isolator device of claim 1, wherein one or more of the first coupling surface and the second coupling surface are located in a plane of the first axis and the second axis.

5. The acoustic isolator device of claim 1, wherein the first coupling surface includes an aperture that accepts a fastener to couple the acoustic isolator device to a panel of a vehicle.

6. The acoustic isolator device of claim 1, wherein the first coupling surface is a floating insert face that is large enough to attach to a vehicle panel without requiring a strict alignment thereof.

7. The acoustic isolator device of claim 1, wherein the second coupling surface includes a second aperture that accepts a fastener to couple the acoustic isolator device to a chassis of a vehicle.

8. The acoustic isolator device of claim 1, wherein:
the first coupling includes a first aperture;
the second coupling surface includes a second aperture;
the first coupling surface is adjacent to the first side face;
the second coupling surface is adjacent to the second side face;
the first aperture accepts a first fastener to fasten the acoustic isolator device to a panel of a vehicle; and
the second aperture accept a second fastener to fasten the acoustic isolator device to a chassis of the vehicle.

9. The acoustic isolator device of claim 8, further comprising a third coupling surface with a third aperture, wherein the third coupling surface is adjacent to the first side face and aligned with the first coupling surface such that the first aperture and the third aperture are aligned to form a via.

10. The acoustic isolator device of claim 9, further comprising a fourth coupling surface with a fourth aperture, wherein the fourth coupling surface is adjacent to the second side face and aligned with the second coupling surface such that the second aperture and the fourth aperture are aligned to form a second via.

11. The acoustic isolator device of claim 10, further comprising a post that projects away from the fourth coupling surface, wherein the post aids in alignment to the chassis of the vehicle.

12. An acoustic isolator device, comprising:
a flat first side face aligned along a first axis as a first portion of an exterior wall;
a flat second side face aligned along the first axis as a second portion of the exterior wall;
a first edge face between the first side face and a first vertex;
a second edge face between the first side face and a second vertex;
a third edge face between the first vertex and the second side face;
a fourth edge face between the second vertex and the second side face;
a first curved face portion between the first edge face and the third edge face about the first vertex;
a second curved face portion between the second edge face and the fourth edge face about the second vertex;
a first coupling surface coupled to the first side face and a second coupling surface coupled to the second side face,
wherein:
the first side face and the second side face are opposite one another with respect to a second axis that is orthogonal to the first axis;
a length of the first edge face is substantially matched to the length of the second edge;
the first and second vertices are equidistant from the second axis and aligned along the first axis;
a length of the third edge face is substantially matched to a length of the fourth edge face;
the first coupling surface is separated from the second coupling surface by an interior cavity region defined by a substantially irregular shaped interior wall; and
a central portion of the interior wall facing the second side face is substantially semi-circle shaped.

13. The acoustic isolator device of claim 12, wherein the first and second curved face portions have a shape that corresponds to one of: an arc, a semi-circle, or a semi-ellipse.

14. The acoustic isolator device of claim 12, further comprising:
the first coupling includes a first aperture;
the second coupling surface includes a second aperture;
the first coupling surface is adjacent to the first side face;
the second coupling surface is adjacent to the second side face;
the first aperture accepts a first fastener to fasten the acoustic isolator device to a panel of a vehicle; and
the second aperture accept a second fastener to fasten the acoustic isolator device to a chassis of the vehicle.

15. The acoustic isolator device of claim 14, further comprising a post that projects away from the first coupling surface, wherein the post aids in alignment to the chassis of the vehicle.

16. A method of manufacturing an acoustic isolator device, the method comprising:
selecting load requirements for the acoustic isolator device;
selecting a material to form the acoustic isolator device;
determining one or more design parameters for the acoustic isolator device based on the selected load requirements and the selected material;
forming the acoustic isolator device from the material using the determined design parameters such that the formed acoustic isolator device has a geometric shape including:
a first side face aligned along a first axis as a first portion of an exterior wall;
a second side face aligned along the first axis as a second portion of the exterior wall, wherein the first side face and the second side face are opposite one another with respect to a second axis that is orthogonal to the first axis;
a first edge face between the first side face and a first vertex;
a second edge face between the first side face and a second vertex, wherein a length of the first edge face is substantially matched to the length of the second edge;
a third edge face between the first vertex and the second side face;
a fourth edge face between the second vertex and the second side face, wherein a length of the third edge face is substantially matched to a length of the fourth edge face;
a first curved face portion between the first edge face and the third edge face about the first vertex;
a second curved face portion between the second edge face and the fourth edge face about the second vertex;
a first coupling surface adjacent a top portion of the first side face with a first aperture;

a second coupling surface adjacent a top portion of the second side face with a second aperture, the second coupling surface separated from the first coupling surface by an interior cavity region defined by a substantially irregular shaped interior wall, wherein a central portion of the interior wall facing the second side face is substantially semi-circle shaped;

a third coupling surface adjacent a bottom portion of the first side face with a third aperture that is aligned with the first aperture; and a fourth coupling surface adjacent the bottom portion of the second side face with a fourth aperture that is aligned with the second aperture.

17. The method of claim 16, wherein forming the acoustic isolator device comprises: molding or machining a material of plastic, Teflon, metal, carbon fiber or elastomer.

18. The method of claim 16, wherein forming the acoustic isolator device further comprises: coating the acoustic isolator a resilient material.

19. The method of claim 16, wherein the determined design parameters correspond to one or more of a leg width, leg length, leg depth and leg thickness for the acoustic isolator device, wherein:

the leg width corresponds to a first distance between the first vertex and the second vertex;

the leg length corresponds to a second distance between the first and third edge faces through the first curved portion; and the leg depth corresponds to a third distance between the top portion of the second side face and the bottom portion of the second side face.

* * * * *